(12) United States Patent
Rejman et al.

(10) Patent No.: US 9,178,377 B2
(45) Date of Patent: Nov. 3, 2015

(54) CHARGING DEVICE, BATTERY, AND METHOD FOR RECOGNIZING A FOREIGN OBJECT

(75) Inventors: Marcin Rejman, Waiblingen (DE); Juergen Mack, Goeppingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 578 days.

(21) Appl. No.: 13/421,462

(22) Filed: Mar. 15, 2012

(65) Prior Publication Data

US 2012/0236903 A1    Sep. 20, 2012

(30) Foreign Application Priority Data

Mar. 17, 2011   (DE) .......................... 10 2011 005 682

(51) Int. Cl.
*G01K 1/08*    (2006.01)
*H02J 7/02*    (2006.01)
*H02J 7/04*    (2006.01)

(52) U.S. Cl.
CPC  *H02J 7/025* (2013.01); *H02J 7/047* (2013.01)

(58) Field of Classification Search
CPC .......................................................... H02J 7/00
USPC ........................................ 374/152; 320/108
See application file for complete search history.

(56) References Cited

U.S. PATENT DOCUMENTS

| | | | | |
|---|---|---|---|---|
| 5,642,717 | A  * |  7/1997 | Gilman et al. ................. | 123/481 |
| 7,633,268 | B2   | 12/2009 | Sakaue et al. | |
| 8,614,561 | B2 * | 12/2013 | Tanabe .......................... | 320/108 |
| 2001/0002786 | A1 |  6/2001 | Najima | |
| 2005/0046393 | A1* |  3/2005 | Nakasho et al. ............... | 320/150 |
| 2005/0073282 | A1* |  4/2005 | Carrier et al. ................. | 320/106 |
| 2008/0164839 | A1* |  7/2008 | Kato et al. .................... | 320/108 |
| 2009/0015197 | A1* |  1/2009 | Sogabe et al. ................ | 320/108 |
| 2010/0072946 | A1* |  3/2010 | Sugano ......................... | 320/108 |

FOREIGN PATENT DOCUMENTS

| | | |
|---|---|---|
| CN | 1591964 A | 3/2005 |
| CN | 101304178 A | 11/2008 |
| CN | 101345437 A | 1/2009 |
| EP | 1699106 A2 | 9/2006 |
| JP | 2001-258182 | 9/2001 |
| JP | 2003-153457 | 5/2003 |
| WO | WO 2009040998 | 4/2009 |
| WO | WO 2011/132471 | 10/2011 |
| WO | WO 2012/004092 | 1/2012 |

* cited by examiner

*Primary Examiner* — Lisa Caputo
*Assistant Examiner* — Nasir U Ahmed
(74) *Attorney, Agent, or Firm* — Kenyon & Kenyon LLP

(57) ABSTRACT

A charging device having a coil for inductive electric charging of a device, in particular of a battery, including a control unit having a temperature sensor for detecting a temperature, the temperature sensor being situated in the area of application for applying the device, and is connected to the control unit, the temperature sensor being situated laterally next to the coil and adjacent to the coil.

17 Claims, 4 Drawing Sheets

CHARGING DEVICE, BATTERY, AND METHOD FOR RECOGNIZING A FOREIGN OBJECT

CROSS REFERENCE

The present application claims the benefit under 35 U.S.C. §119 of German Patent Application No. DE 102011005682.3 filed on Mar. 17, 2011, which is expressly incorporated herein by reference in its entirety.

FIELD OF THE INVENTION

The present invention relates to a charging device, a battery, and a method for recognizing a foreign object during an inductive charging procedure.

BACKGROUND INFORMATION

A method for recognizing a foreign object during an inductive charging procedure with the aid of a temperature sensor is described in PCT Application No. WO2009/040998 A1.

SUMMARY

An object of the present invention is to provide an improved charging device, an improved battery, and an improved procedure for recognizing a foreign object during an inductive charging procedure.

One advantage of a charging device in accordance with the present invention is that the temperature is accurately detected and it is influenced as minimally as possible by the coil of the charging device despite the inductive charging procedure. This is achieved by situating the temperature sensor outside of, but adjacent to, the coil.

In accordance with the present invention, the temperature sensor is situated outside of, but adjacent to, the coil. The inductive charging procedure of the battery is not impaired thereby, and the temperature may still be accurately detected.

Furthermore, an example method is provided for foreign object recognition by detecting two temperature values in the charging area with the aid of at least two temperature sensors, a foreign object being reliably recognized as a function of the two temperature values, in particular as a function of a temperature difference between the two temperature values or as a function of a difference between the temperature gradients of the two temperature values by comparison with a reference value. The accuracy of the example method is increased due to the use of two temperature sensors.

In one example embodiment of the charging device, multiple temperature sensors are situated distributed around the circumference of the coil. The temperature sensors preferably have the same angular distance from each other and are preferably situated in a circle. In this way, accurate detection of the position of the foreign object is possible.

In another specific embodiment, the charging device has a housing having a plate, which is situated in the charging area. A recess, in which the temperature sensor is situated, is provided in the plate. In this way, the distance between the plate surface and the temperature sensor is reduced, while a sufficiently stable plate is still provided. The temperature may thus be detected more accurately and a temperature change may be detected more rapidly. The plate is preferably made of a thermally conducting material.

In another specific embodiment, a thermally conducting arrangement is provided, which couples the temperature sensor to the housing of the charging device. Faster and improved temperature detection is thus possible.

In another specific embodiment, the temperature sensor is situated on a printed circuit board, which is provided on an internal side of the housing. This specific embodiment is simple and cost-effective. The temperature sensor is preferably designed as an SMD component.

In another specific embodiment, the printed circuit board has a preferably circular opening, the coil being situated in the opening. The printed circuit board may thus be pushed over the coil and attached to the charging side of the housing. The inner diameter of the printed circuit board is preferably somewhat greater than the outer diameter of the coil, so that the temperature sensors are situated close to the coil.

In one refinement of the method, a third temperature value is detected with the aid of a third temperature sensor, and the third temperature value is evaluated in order to recognize the foreign object. The accuracy of foreign object recognition is thus increased.

In another embodiment, the position of the foreign object between two temperature sensors is recognized by the fact that the temperature value and/or the gradient over time of the temperature value of the third temperature sensor is/are less than the temperature value and/or the gradient over time of the temperature value of the first and the second temperature sensors. The foreign object between the first and the second temperature sensors may thus be located.

The present invention is explained in greater detail below with reference to the figures.

DETAILED DESCRIPTION OF EXAMPLE EMBODIMENTS

Figure 1:
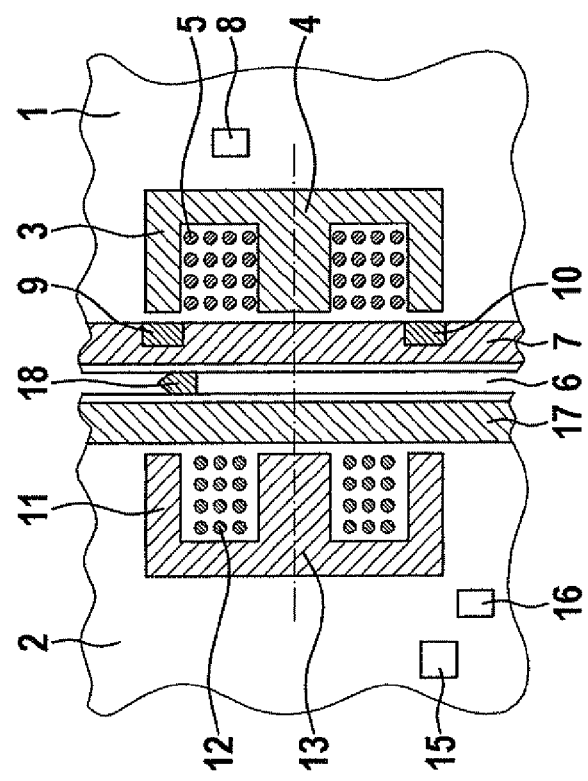
FIG. 1 shows a schematic illustration of a charging device and a device to be charged having a battery.

FIG. 1 shows a schematic illustration of a partial section of a charging device 1 and a partial section of a device 2 having a battery. Charging device 1 has a current source (not illustrated), which supplies current to a transmission coil 3 via a control unit 8. Transmission coil 3 has a core 4 and a coil 5. Transmission coil 3 is designed in such a way that it emits electromagnetic radiation for transmitting power. Transmission coil 3 is situated adjacent to a wall 7 of a housing of charging device 1. The windings of coil 5 are situated in planes which are parallel to the plane of wall 7. FIG. 1 shows a charging area 6 of charging device 1, on which device 2 having a battery may be applied for inductively charging the battery, as illustrated in FIG. 1. The charging device and the device may be situated side-by-side or one on top of the other. Device 2 has a receiving coil 11, which is connected to a battery 16 via a second control unit 15. Receiving coil 11 has a second coil 12 and a second core 13. Receiving coil 11 is situated on a second wall 17 of a housing of device 2. Second wall 17 is oriented in parallel to wall 7. Device 2 may be designed as an electric battery 16, i.e., a chargeable battery or battery pack, which has electric and electronic circuits for inductive charging. Furthermore, device 2 may also be designed in the form of an electrical device, for example, of a hand tool or a kitchen appliance having an electric battery.

When battery packs or terminal devices having built-in chargeable battery cells are inductively charged, the magnetic field is used for power transmission between the charging device and the receiving device, i.e., the battery or battery pack or the terminal device. The receiving device stores most of the received or transmitted energy in the battery cells. An inductive coupling is required for transmitting power from the charging station to the receiving device. The inductive coupling is designed, for example, in the form of two coils, which normally have a coil core. The inductive coupling may be used over a distance of up to a few centimeters for transmitting power. In addition, a resonant inductive coupling may be used for increasing the efficiency. However, in the case of inductive charging, foreign objects may get into the interface area between charging device and terminal device. Electrically and magnetically conductive foreign objects may impair the efficiency of the inductive coupling. In addition, foreign objects may strongly heat up in the electromagnetic field and thus cause damage.

FIG. 1 schematically shows a foreign object 18 situated between walls 7, 17 of the charging device and of terminal device 2 in charging area 6 between transmission coil 3 and receiving coil 11.

Charging device 1 has a first and a second temperature sensor 9, 10 on the inner side of wall 7. Temperature sensors 9, 10 are connected to control unit 8 via signal lines. In the specific embodiment illustrated, temperature sensors 9, 10 are installed in recesses 19 of wall 7. The distance between an outer side of wall 7 and temperature sensors 9, 10 is thus reduced. Heat generated by foreign object 18 on the outer side of wall 7 may thus be detected more accurately and rapidly with the aid of temperature sensors 9, 10. Temperature sensors 9, 10 may also be situated on the inner side of wall 7, depending on the design. Recesses 19 are therefore not necessarily required.

In the illustrated exemplary embodiment, temperature sensors 9, 10 are situated outside an outer radius of coil 5. In this way, the ability of coil 5 to generate the electromagnetic field is not affected by temperature sensors 9, 10. In the illustrated embodiment, temperature sensors 9, 10 are situated in front of an external annular area of core 4. Depending on the selected specific embodiment, temperature sensors 9, 10 may also be situated directly in front of coil 5 or in wall 7. Tests have shown that placing temperature sensors 9, 10 as close as possible to coil 5, but still outside of the outer radius of coil 5 is, on the one hand, sufficient for detecting foreign objects 18, while, on the other hand, barely affects the inductive coupling between coils 5 and 12.

Depending on the selected specific embodiment, temperature sensors may also be situated in device 2 and connected to second control unit 15 via sensor lines. The temperature sensors may be situated in device 2 in the same way that the temperature sensors may be situated in the charging device. In this specific embodiment, second control unit 15 may have, for example, a visual display, emit a signal when a foreign object is recognized, and/or transmit the signal to control unit 8 via a signal path. The signal path may be designed in the form of a line having contacts in the charging area or as a wireless signal link having transmitters and receivers. Control unit 8 may thus recognize a foreign object in charging area 6 of charging device 1 on the basis of the control unit's own temperature sensors or on the basis of the temperature sensors of device 2.

The basic principle of the foreign object recognition is recognizing a foreign object by a deviation of the temperature from normal operation, for example, by a local temperature increase or by an excessively high temperature in the entire charging area. When the foreign object is recognized, the power transmitted via transmission coil 3 may be reduced, for example, or power transmission may be completely interrupted. Thermal foreign object recognition may be used as an additional safety measure in addition to other foreign object recognition methods such as, for example, inductive foreign object recognition.

Figure 2:
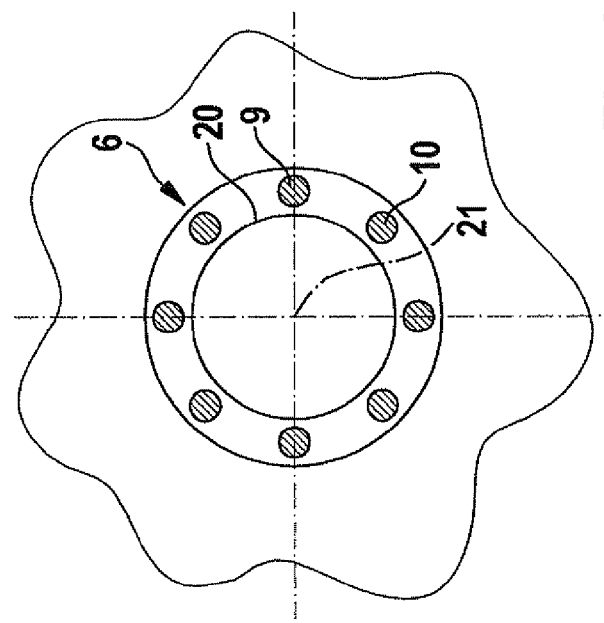
FIG. 2 shows a schematic top view of a charging area of the charging device.

FIG. 2 shows a schematic illustration of charging area 6 of charging device 1 or of device 2, charging area 6 being represented in the form of a circular surface. Charging area 6 is essentially determined by the outer contour of core 4. The illustration shows an inner radius 20, which represents the outer radius of coil 5. In the illustrated exemplary embodiment, multiple temperature sensors 9, 10 are situated symmetrically distributed around the annular outer contour of coil 5. The temperature sensors are represented as black dots. In the illustrated exemplary embodiment, eight temperature sensors 9, 10 are situated, the angular distance between two temperature sensors being 45°. The temperature sensors preferably have the same distance to a center 21 of coil 5. Depending on the selected specific embodiment, the temperature sensors may also have different distances to the center and/or also different angular distances to each other. For example, the temperature sensors may be situated around the outer radius of core 4 of coil 5. A defined configuration, a so-called matrix or an array of multiple temperature sensors, is thus provided in the charging area for temperature detection.

Due to the configuration of the temperature sensors, a foreign object, which heats up, may be reliably and unambiguously detected due to a local temperature increase. Furthermore, in one exemplary embodiment, the change over time of the temperature curve, i.e., of the temperature gradient of at least one of the temperature sensors, is used for reliably recognizing a local heat-up. Each of the temperature sensors is connected to control unit 8 via a signal line. Control unit 8 has an evaluation unit or an evaluation logic, using which the reported temperatures may be analyzed and a foreign object may be recognized. Control unit 8 is connected to a memory, in which comparative values or comparative characteristic curves are stored. Control unit 8 may, depending on the recognition of the foreign object, reduce the performance of the transmission coil or completely interrupt the power transmission.

Figure 3:
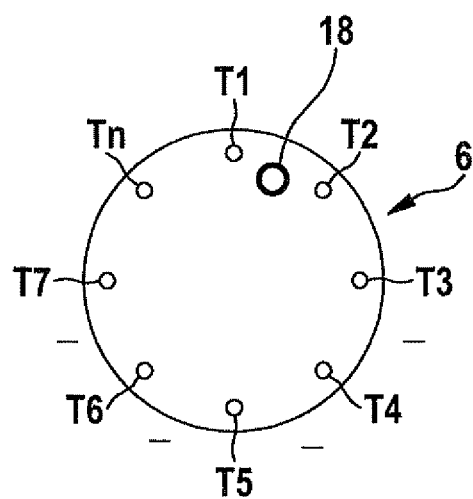
FIG. 3 shows a first measuring situation having a foreign object in the charging area.

FIG. 3 schematically shows a typical incident, in which a foreign object 18 is situated between two temperature sensors T1, T2 of a configuration of temperature sensors T1, T2, . . . , Tn according to FIG. 2.

Figure 4:
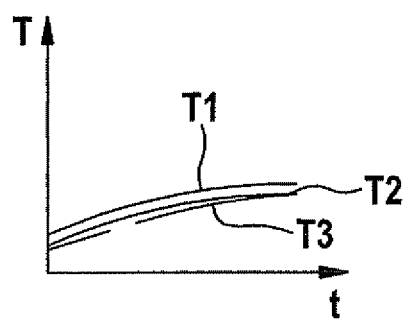
FIG. 4 shows a diagram of the temperature characteristic curves of three temperature sensors during normal operation.

FIG. 4 shows a diagram of temperature T over time t for the first, second, and third temperature sensors T1, T2, T3 for a normal operation of the charging device without a foreign object. It is apparent that the temperatures of the three temperature sensors differ from each other, but they remain essentially constant over time, i.e., slightly increase over time.

Figure 5:
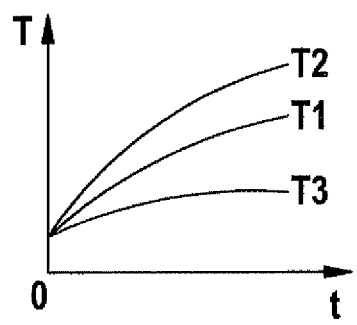
FIG. 5 shows a diagram of the temperature characteristic curves of three temperature sensors during a foreign object recognition.

FIG. 5 shows the temperature variation in the situation where a foreign object is situated in the area of second temperature sensor T2 between first and second temperature sensor T1, T2, as shown in FIG. 3. At the beginning of the inductive charging procedure at point in time 0, the temperature values of the three temperature sensors T1, T2, T3 are the same. Foreign object 18 heats up during the inductive charging procedure. Since foreign object 18 is situated closer to second temperature sensor T2, second temperature sensor T2 detects increasing temperature values faster than first temperature sensor T1, as shown in FIG. 5. Third temperature sensor T3 is farther away from the foreign object than first temperature sensor T1, so that the increase in the temperature values of third temperature sensor T3 over time is less than the increase in temperature values of first temperature sensor T1 over time. Thus, when using three temperature sensors, the position of the foreign object may be ascertained either directly on one of the temperature sensors or between two temperature sensors by comparing the temperature values and/or by comparing the increases in the temperature values over time.

With the aid of the above-described configuration, the following three typical incidents may be detected, for example:

1. First incident: locally substantially higher absolute temperature compared to any two adjacent temperature sensors.

Figure 6:
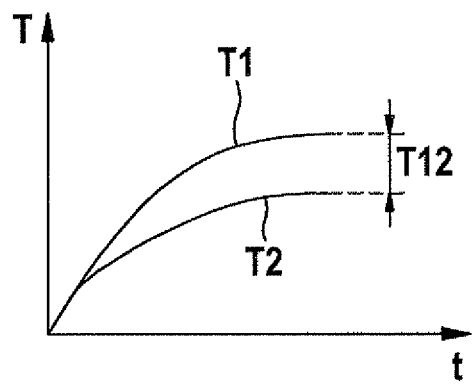
FIG. 6 shows another diagram having two temperature characteristic curves of two temperature sensors.

If the absolute temperatures differ considerably between any two adjacent temperature sensors, an incident is inferred. In the present example, which is illustrated in FIG. 6, the temperatures detected by temperature sensors T1 and T2 differ by the difference T12. If temperature difference T12 exceeds a maximum temperature difference which is stored in the control unit and is freely selectable by the user, a shutdown of the power transmission is initiated by the control unit, for example.

2. Second incident: locally substantially higher absolute temperature compared to any three adjacent temperature sensors.

Figure 7:
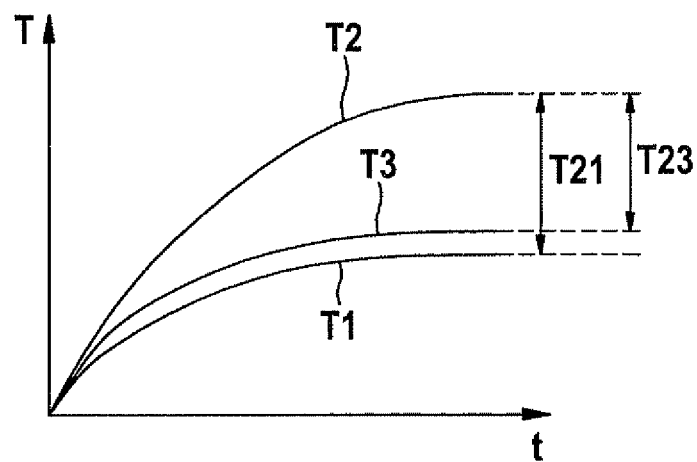
FIG. 7 shows another diagram having three temperature characteristic curves of three temperature sensors.

The second incident is generally identical to the first incident, but any three adjacent temperature sensors are used for the evaluation. Furthermore, a plausibility check is performed in that the temperature of the temperature sensor situated in the middle of the three temperature sensors may not substantially differ from the two external temperature sensors. For example, if the two external temperature sensors T1 and T3 show an almost identical level, but the middle temperature sensor T2 shows a much higher temperature than do first and third temperature sensors T1, T3, the shutdown of the power transmission is initiated by the control unit. The temperature detected by second temperature sensor T2 must exceed the established maximum temperature difference. This incident is illustrated in FIG. 7.

3. Third incident: very steep temperature increase of any temperature sensor compared to normal operation.

If the temperature measured by any temperature sensor rises faster than normal, an incident is inferred. Faster than normal means here that the temperature change over time is greater than during normal operation by a factor a fixedly stored in the system. Factor a may be set individually as a function of the charging device used. The temperature change over time in normal operation may be stored in the control unit as a value or empirically ascertained via a measurement series during operation. If this incident occurs, the control unit terminates the power transmission.

The above-described device and the above-described method offer the advantage that the overall system security or system reliability is increased and even small and medium-sized foreign objects are reliably and unambiguously detected. In addition, an excessively high temperature may be recognized in the entire charging area. Furthermore, the inductive power transmission remains unaffected by the temperature sensors provided.

Common sensor types such as NTC, PTC, PT100 may be used as temperature sensors. As can be seen in the figure, even during normal operation without a foreign object, a system-related uniform temperature increase occurs in the entire charging area. Therefore, all temperature sensors show a similar temperature increase.

As stated previously, device 2 may also have appropriate temperature sensors and perform detection of the foreign object as already described for charging device 1.

Figure 8:
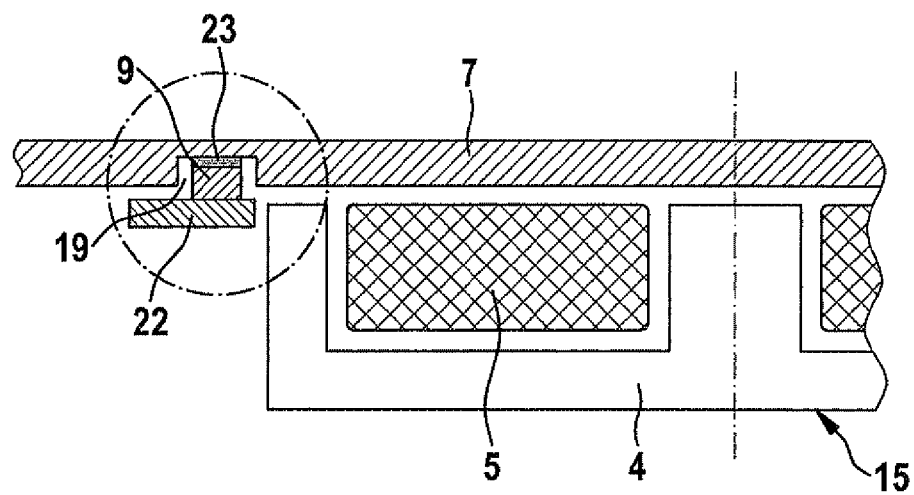
FIG. 8 shows another specific embodiment of a charging device.

FIG. 8 shows a schematic illustration of another specific embodiment, in which temperature sensor 9 is situated outside of core 4 of transmission coil 3. Similarly, in this specific embodiment, all temperature sensors 9, 10 are situated outside of the outer circumference of core 4. In the specific embodiment illustrated, temperature sensor 9 is installed in a recess 19 on the inner side of wall 7. A thermally conducting element 23 may preferably be provided between temperature sensor 9 and wall 7, to increase the thermal coupling between wall 7 and temperature sensor 9. Depending on the selected specific embodiment, temperature sensor 9 may also be situated on the inner side of wall 7 without recess 19. In this case, as well, a thermally conducting means may be used for improving the thermal coupling between wall 7 and temperature sensor 9. In the specific embodiment illustrated, temperature sensor 9 is situated on a printed circuit board 22, for example, in the form of an SMD component. Depending on the selected specific embodiment, all temperature sensors may be situated on a printed circuit board 22. Printed circuit board 22 has a recess, which is situated on the outer contour of transmission coil 3. For example, printed circuit board 22 may be designed in the form of a ring.

Figure 9:
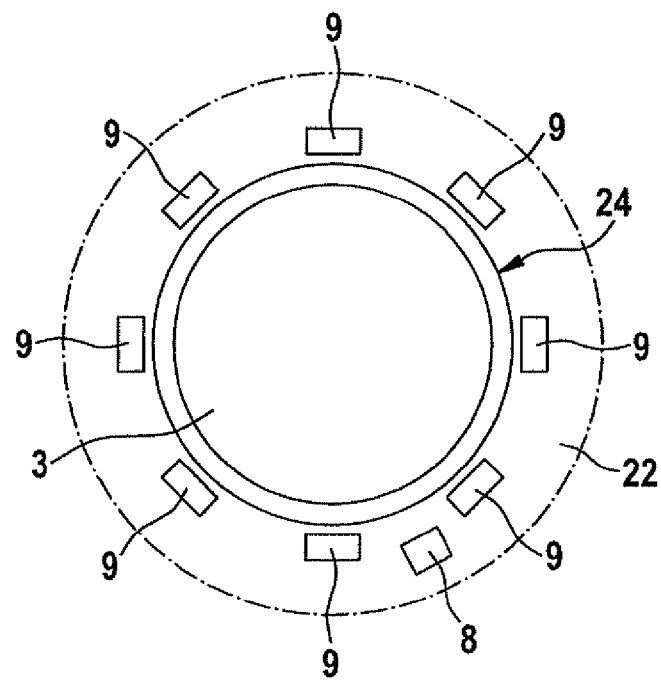
FIG. 9 shows a printed circuit board.

FIG. 9 shows printed circuit board 22 having circular opening 24, eight temperature sensors 9 being situated uniformly distributed around opening 24. The temperature sensors are situated as close as possible to the inner edge of printed circuit board 22. The outer contour of the printed circuit board may have a circular design or may have another shape, which is adapted to the housing, for example.

What is claimed is:

1. A charging device, comprising:
    a coil for inductive electric charging of a device;
    a control unit; and
    at least one temperature sensor configured to detect a temperature generated by a foreign object external to the charging device,
    wherein the temperature sensor is:
        situated in a charging area for charging of the device,
        connected to the control unit, and
        situated adjacent to an outside of the coil,
    wherein the temperature sensor is situated on a printed circuit board which has an opening, the coil is arranged inside the opening and the temperature sensor is arranged adjacent to an inner edge of the opening of the printed circuit board.

2. The charging device as recited in claim 1, wherein the device is a battery.

3. The charging device as recited in claim 1, wherein the at least one temperature sensor includes multiple temperature sensors distributed in a circle, wherein adjacent ones of the multiple temperature sensors have an identical distance to one another.

4. The charging device as recited in claim 1, wherein the charging device includes a housing having a plate which is adjacent to the charging area, the plate having a recess on an inner side, and the temperature sensor being situated in the recess.

5. The charging device as recited in claim 1, further comprising:
a thermally conducting element situated between the temperature sensor and a housing of the charging device to increase the thermal conductivity between the temperature sensor and the housing.

6. The charging device as recited in claim 1, wherein the temperature sensor is an SMD component.

7. The charging device as recited in claim 6, wherein the opening has a circular design, and the printed circuit board has an inner diameter which is approximately equal to an outer diameter of the coil.

8. The charging device as recited in claim 1, wherein the charging device further comprises a coil core.

9. The charging device as recited in claim 1, wherein the temperature sensor is situated outside an outer radius of the coil.

10. A battery, comprising:
a coil and an electric circuit for inductively charging the battery; and
a temperature sensor configured for detecting a temperature generated by a foreign object external to the battery,
wherein the temperature sensor is:
    situated in a charging area for applying a charging device,
    connected to a control unit; and
    situated adjacent to an outside of the coil,
wherein the temperature sensor is situated on a printed circuit board which has an opening, the coil core and the coil are arranged inside the opening and the temperature sensor is arranged adjacent to an inner edge of the opening of the printed circuit board.

11. The battery according to claim 10, wherein a signal path is provided, which enables a connection between the control unit of the battery and a control unit of the charging device.

12. A charging device, comprising:
a coil core and a coil for inductive electric charging of a device;
a control unit; and
at least one temperature sensor configured to detect a temperature generated by a foreign object external to the charging device,
wherein the temperature sensor is:
    situated in a charging area for charging of the device,
    connected to the control unit, and
    situated adjacent to an outside of the coil core,
wherein the temperature sensor is situated on a printed circuit board which has an opening, the coil core and the coil are arranged inside the opening and the temperature sensor is arranged adjacent to an inner edge of the opening of the printed circuit board.

13. The charging device as recited in claim 8, wherein the coil core has an outer contour which defines the charging area.

14. The charging device as recited in claim 8, wherein the temperature sensor is situated in front of an external annular area of the coil core.

15. The charging device as recited in claim 8, wherein the temperature sensor is situated outside of the coil core.

16. The charging device as recited in claim 8, wherein the temperature sensor is situated outside an outer circumference of the coil core.

17. The charging device as recited in claim 8, wherein the printed circuit board has a recess, the recess is situated on the outer contour of the coil core.

* * * * *